E. MONTGOMERY.
BORING DEVICE.
APPLICATION FILED MAY 6, 1915.
1,202,875.
Patented Oct. 31, 1916.
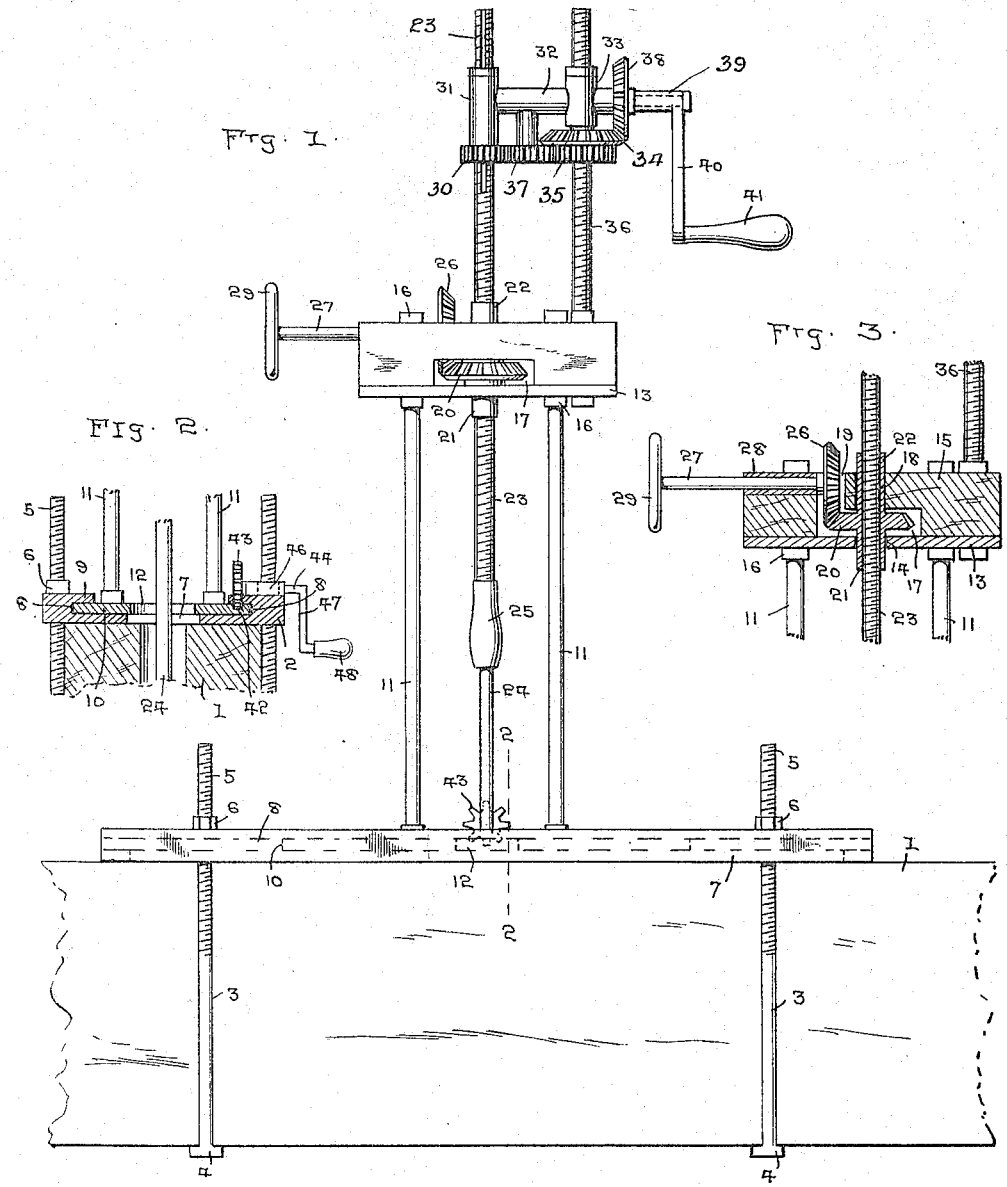
E. Montgomery — Inventor
Witnesses
Thos W Riley
J. H. Reid.
By W. J. Fitzgerald
Attorney

UNITED STATES PATENT OFFICE.

ESRA MONTGOMERY, OF CYRENE, GEORGIA.

BORING DEVICE.

1,202,875.  Specification of Letters Patent.  Patented Oct. 31, 1916.

Application filed May 6, 1915. Serial No. 26,198.

*To all whom it may concern:*

Be it known that I, ESRA MONTGOMERY, a citizen of the United States, residing at Cyrene, in the county of Decatur and State of Georgia, have invented certain new and useful Improvements in Boring Devices; and I do hereby declare the following to be a full, clear, and exact description of the invention, such as will enable others skilled in the art to which it appertains to make and use the same.

This invention relates to a boring device and more particularly to that class of devices used for boring timbers and the like.

One of the objects of this invention resides in the provision of a boring device provided with means for fixedly clamping the same to a piece of timber during the boring operation.

Another object of this invention resides in the provision of means for adjusting the operating parts for boring a series of holes at each clamping operation.

Another object of this invention is the provision of a movable frame provided with means for rotating the boring bit shaft and also provided with means for effecting the advancing and receding movements of the frame relative to and along the longitudinal direction of the boring bit shaft.

A further object of this invention resides in the novel means for effecting the feeding of the boring bit shaft at any desired rate of speed during the boring operation.

These and other objects will more fully appear as the nature of the invention is more clearly understood from the following specification, the subject matter of the claims, and the views shown in the accompanying drawings, in which, Figure 1 is a side elevation of the device, showing the same in attached operative position upon a piece of timber. Fig. 2 is a detail sectional view on line 2—2 of Fig. 1, showing the means for adjusting the upper portion of the device with respect to the lower portion. Fig. 3 is a detail sectional view of a portion of Fig. 1, showing the means for feeding the boring bit.

Referring to the drawings, 1 denotes a piece of timber or other object to be bored, and 2 denotes the base plate of the boring device.

The base plate 2 is designed to be placed against the surface of the timber 1 or other object and fixedly secured thereto through the medium of the clamping rods 3. The rods 3 are provided with the L-shaped claw heads 4 which grip the opposite corners of the timber 1, the opposite ends of the clamping rods 3 are screw threaded as at 5 and pass through apertures formed in proximity to the corners of the base plate 2. Upon the screw threaded ends 5 of the clamping rods 3 are the nuts 6 which bear upon the upper surface of the base plate 2 for retaining the timber 1 between the base plate 2 and the L-shaped claw heads 4 of the clamping rods 3 when the nuts 6 are screwed home upon the threaded ends 5 of the clamping rods 3. The base plate 2 is formed of an elongated rectangular plate provided with the elongated slot 7 which extends along the longitudinal medial line of the base plate 2 but terminates at a point slightly remote from the ends of the base plate 2. Within the walls of the base plate 2 which face the slot 7 are formed the oppositely facing channels 8, the upper walls 9 of the channels 8 are cut away and provide overlapping flanges.

Slidably mounted within the base plate 2 and the channels 8 thereof, and retained therein by the upper walls or flanges 9 is the supporting plate 10 having suitably secured thereupon four standards or posts 11. The standards or posts 11 are preferably arranged in the form of a square surrounding the aperture 12 formed centrally in the supporting plate 10. Upon the upper ends of the standards or posts 11 is mounted the bearing plate 13 provided with the central aperture 14. Upon the standards 11 and resting on the bearing plate 13 is the housing or block 15, the bearing plate 13 and housing 15 being secured upon the upper ends of the standards 11 through the medium of the nuts 16 arranged at each side thereof. The housing or block 15 is recessed as at 17 and is provided with the aperture 18 registering with the aperture 14 of the bearing plate 13, and also at one end of the recess 17 is formed the slot way 19 extending from the recess 17 to the upper surface of the housing or block 15.

Within the recess 17 of the housing 15, and bearing on the bearing plate 13 is the bevel gear wheel 20, provided with the extended hub portion 21 which is loosely mounted in the aperture 14 of the bearing plate 13, and the extended hub portion 22 which is loosely mounted in the aperture 18 of the housing or block 15. The bevel gear 20 and its extended hub portions 21 and 22 are provided with an internally screw threaded bore for normally engaging the threaded portion of the boring shaft 23 of the boring bit 24 secured upon the lower end of the shaft 23 by the socket 25. The bevel gear 20 and its hub extensions 21 and 22 are designed to remain normally stationary for feeding the shaft 23 downwardly at a normal rate of speed during the boring operation, and for increasing or decreasing the feed of the shaft 23 either above or below the normal rate of speed when necessary the bevel gear 20 is rotated either forwardly or rearwardly by the bevel gear 26 meshing with the bevel gear 20, the bevel gear 26 operating in the slot way 19 of the housing 15 and actuated by the shaft 27 journaled in the bearing block 28 secured upon the housing 15, the shaft 27 being provided at its outer end with the hand wheel 29 for manually rotating the bevel gears 26 and 20 respectively in either direction and at any desired degree of rapidity either during the boring operation or when reversing the direction of rotation of the shaft 23 for returning the same to inoperative position.

For rotating the boring shaft 23 and the bit 24, the upper portion of the shaft 23 is grooved and has arranged thereon the spur gear 30 slidably keyed or otherwise operatively mounted upon the shaft 23. The upper portion of the shaft 23 extends through the hub of the spur gear 30 which is rotatably mounted in the bearing 31 of the frame 32, the frame 32 being provided with the bearing 33 having rotatably mounted therein the internally screw threaded hub of the bevel gear 34 provided at one side with the spur gear 35, the screw threaded hub of the bevel gear 34 engages the screw threaded supporting standard 36, which is formed with the same pitch of threads as those of the boring shaft 23 and the bevel feed gear 20 and its hubs 21 and 22, and is secured upon the housing 15 and bearing plate 13 at one end thereof and at one side of the boring shaft 23.

The frame 32 is arranged to normally travel up and down with the boring shaft 23, and this is accomplished by the connecting spur gear 37 suitably mounted upon the frame 32 and meshing with the spur gear 30, and the spur gear 35 of the bevel gear 34 meshing with the bevel gear 38, the bevel gear 38 being revolubly mounted upon the journal shaft 39 suitably mounted upon the bearing 33 of the frame 32, the journal shaft 39 having also revolubly mounted thereon the crank arm 40 which is suitably secured to the bevel gear 38 and upon the free end of which is secured the operating handle 41, whereby upon operating the handle 41 and crank arm 40 the bevel gear 38 is rotated along with the bevel gear 34 and its spur gear 35, and the spur gear 37 meshing respectively with the spur gears 30 and 35 will revolve the hub of the spur gear 30 and the boring shaft 23 simultaneously, whereupon the boring shaft 23 will descend at a normal rate of speed as the same revolves through the screw threaded bore of the bevel gear 20, and the frame 32 will simultaneously descend through the medium of the screw threaded hub of the bevel gear 34 traveling downwardly upon the screw threaded supporting standard 36, the reverse operation taking place when the operating handle 41 is actuated in the opposite direction, for raising the shaft 23 and bit 24. Should it be desired, however, to increase the feed of the boring shaft 23 above its normal rate of speed, or decrease the feed of the same below its normal rate of speed, the bevel feed gear 20 is either revolved forwardly for more rapidly advancing the boring shaft 23, or the bevel feed gear 20 may be revolved rearwardly or in the opposite direction for retarding the advance of the boring shaft 23 when necessary, the feed gear 20 being revolved in either case as rapidly as is deemed necessary, these respective manipulations of the boring shaft 23 being made possible by the upper end of the boring shaft 23 being slidably keyed through the operating spur gear 30 and its hub revolubly mounted in the frame 32, the frame 32, however, traveling downwardly upon the screw threaded supporting post 36 at a normal or unchanged rate of speed, and upon the reverse movement of the operating handle 41 for returning the boring shaft 23 to inoperative position, the shaft 23 will be elevated and likewise the frame 32 by being moved upwardly upon the threaded supporting post 36, and if desired the feed gear 20 may so revolve for increasing the upward movement of the boring shaft 23 for positioning the same at its uppermost limit in the frame 32.

To adjust the bit 24 and its operating mechanisms for consecutively boring a series of holes in the timber 1, the supporting plate 10, which is slidably mounted in the base plate 2, has one of its side edges provided with the rack 42, which is engaged by the teeth of the pinion 43 secured upon the end of the shaft 44 revolubly mounted in the bearing 46 secured upon the upper side of the base plate 2 at one side edge thereof, and substantially central of the ends of the base plate 2. The shaft 44 and the pinion 43 are rotated by the crank arm 47 having the handle 48 secured upon the free end thereof. The rotation of the pinion 43 owing to its engagement with the teeth of the rack 42 will cause the supporting plate 10 to be moved longitudinally within the base plate 2 for positioning the bit 24 and its operating parts in the desired position.

All of the parts constituting the invention may be formed of any suitable metal, but I preferably form the housing or block 15 of hard wood, as I deem the hard wood housing equally as efficient as metal and the same can be more readily formed. Furthermore, while I have shown and described the invention as being particularly adapted for boring a series of holes in timber, I desire it to be understood that the invention is not limited to this specific use, as the same may also be used for boring metal by substituting a metal boring bit for the wood boring bit 24 as herein inferred.

The manner of slidably mounting the upper end of the boring shaft 23 through the operating spur gear 30 revolubly mounted in the frame 32 admits of the use of any desired length of boring shaft, and by the mounting the movable frame 32 upon the screw threaded supporting post 36, the frame 32 is enabled to travel upwardly and downwardly upon the post 36 relative to and in the longitudinal direction of the boring shaft 23, and by this arrangement the frame 32 will travel downwardly with the boring shaft 23 or upwardly therewith, though the boring shaft 23 may be moved for increasing or retarding its movements independently of the movement of the frame 32, and as the weight of the frame 32 and the operating gears thereupon are maintained by the threaded supporting post 36 the boring shaft 23 is entirely relieved of this weight thereby prolonging the life of the threads upon the boring shaft 23 and the threads within the feed gear 20 and its hubs, which would not be the case if the boring shaft 23 were required to sustain the weight of the frame 32 and the operating gears carried thereby, and again, when using a long boring shaft and the frame 32 has reached its lowermost limit upon the post 36, the frame 32 may be run upwardly to the top of the post 36, the feed gear 20 being revolved in a manner for preventing any upward movement of the boring shaft, and when the frame 32 has reached the top of the post 36 the same will be operated for again lowering the frame 32 upon the post 36, and this may be repeated until the top of the boring shaft has been reached.

Having described my invention, what I claim as new and desire to secure by Letters Patent, is:—

1. A boring device, comprising a plate having supporting standards thereon, a housing upon the upper end of said supporting standards, a screw threaded supporting post upon said housing, a frame upon said screw threaded supporting post, a boring shaft slidably mounted through one end of said frame, means carried by said frame for causing the same to travel upon said supporting post in either direction from end to end, means also carried by said frame for rotating said boring shaft, a feed gear rotatably mounted within said housing, and means upon said housing for rotating said feed gear in either direction for increasing or decreasing the feed of said boring shaft at a rate independently of the rate of travel of said frame upon said screw threaded supporting post.

2. A boring device, comprising a supporting plate having supporting standards thereon, a housing upon said supporting standards, a feed gear revolubly mounted within said housing and provided with internal screw threads, a screw threaded boring shaft projecting through said feed gear, means upon said housing for actuating said feed gear for controlling the feed of said boring shaft, a threaded supporting post upon one end of said housing, a frame upon said threaded supporting post provided with means for causing said frame to travel upon said supporting post in either direction, means carried by one end of said frame for slidably engaging said boring shaft and for rotating the same, whereby the weight of said frame and its operating devices is maintained by said threaded supporting post thereby relieving the threads of said boring shaft and feed gear of undue wear by the weight of said frame and admitting of the independent movements of said boring shaft relative to the movements of said frame.

In testimony whereof I have signed my name to this specification in the presence of two subscribing witnesses.

ESRA MONTGOMERY.

Witnesses:
    JAMES HEARD,
    JOHN MORE.

Copies of this patent may be obtained for five cents each, by addressing the "Commissioner of Patents, Washington, D. C."